United States Patent
Domokos

(10) Patent No.: US 6,311,045 B1
(45) Date of Patent: Oct. 30, 2001

(54) APPARATUS FOR SIGNAL ISOLATION IN A RADIO TRANSMITTER-RECEIVER

(75) Inventor: John Domokos, Hampshire (GB)

(73) Assignee: Roke Manor Research Limited, Hampshire (GB)

( * ) Notice: Subject to any disclaimer, the term of this patent is extended or adjusted under 35 U.S.C. 154(b) by 0 days.

(21) Appl. No.: 09/123,288

(22) Filed: Jul. 28, 1998

(30) Foreign Application Priority Data

Jul. 28, 1997 (GB) .................................................. 9715842
Jul. 21, 1998 (GB) .................................................. 9815748

(51) Int. Cl.$^7$ ..................................................... H04B 1/48
(52) U.S. Cl. ................................ 455/78; 455/24; 455/63; 455/278.1; 455/284; 455/295; 455/296
(58) Field of Search ........................... 455/78, 79, 80, 455/81, 82, 83, 24, 278.1, 283, 284, 295, 296, 501, 63; 702/191; 343/895

(56) References Cited

U.S. PATENT DOCUMENTS

| | | | |
|---|---|---|---|
| 3,696,429 | * 10/1972 | Tressa | .................................. 455/24 X |
| 4,349,919 | 9/1982 | Richardson . | |
| 4,952,193 | * 8/1990 | Talwar | .............................. 455/295 X |
| 5,140,699 | * 8/1992 | Kozak | ............................ 455/278.1 X |
| 5,574,978 | * 11/1996 | Talwar et al. | ......................... 455/63 |
| 5,584,065 | * 12/1996 | Monzello | ...................... 455/278.1 X |
| 5,652,715 | * 7/1997 | Hanson | ................................. 702/191 |
| 5,691,978 | * 11/1997 | Kenworthy | ........................ 455/296 X |
| 5,708,448 | * 1/1998 | Wallace | ................................. 343/895 |

* cited by examiner

Primary Examiner—William Trost
Assistant Examiner—Philip J. Sobutka
(74) Attorney, Agent, or Firm—Crowell & Moring LLP

(57) ABSTRACT

A radio communications transceiver which operates to transmit radio signals via a transmit antenna and receive radio signals via a receive antenna, wherein said transmit and receive antennas are disposed to provide at least a substantial amount of radio signal isolation therebetween. The radio communications transceiver further includes a cancellation device comprising a first coupler coupled to the transmit antenna and arranged to extract a sample of the transmit signal, a second coupler coupled to the receiver antenna and arranged to extract a sample of the received signal, a correlator fed on first and second inputs with the transmit and the received signal samples respectively, the correlator operating to generate an error signal representative of a correlation of the transmit and received radio signals, which error signal is fed to a modulator which operates to modulate the transmit signal sample, consequent upon the error signal. The modulated transmit signal is fed to the radio receiver via a further coupler, and serves to substantially cancel transmit signals received by the receiver antenna, the cancellation device operating in combination with the disposal of the transmit and receive antennas to effect a desired radio signal separation between the transmit and receive signals.

21 Claims, 6 Drawing Sheets

APPARATUS FOR SIGNAL ISOLATION IN A RADIO TRANSMITTER-RECEIVER

BACKGROUND OF THE INVENTION

Figure 1:
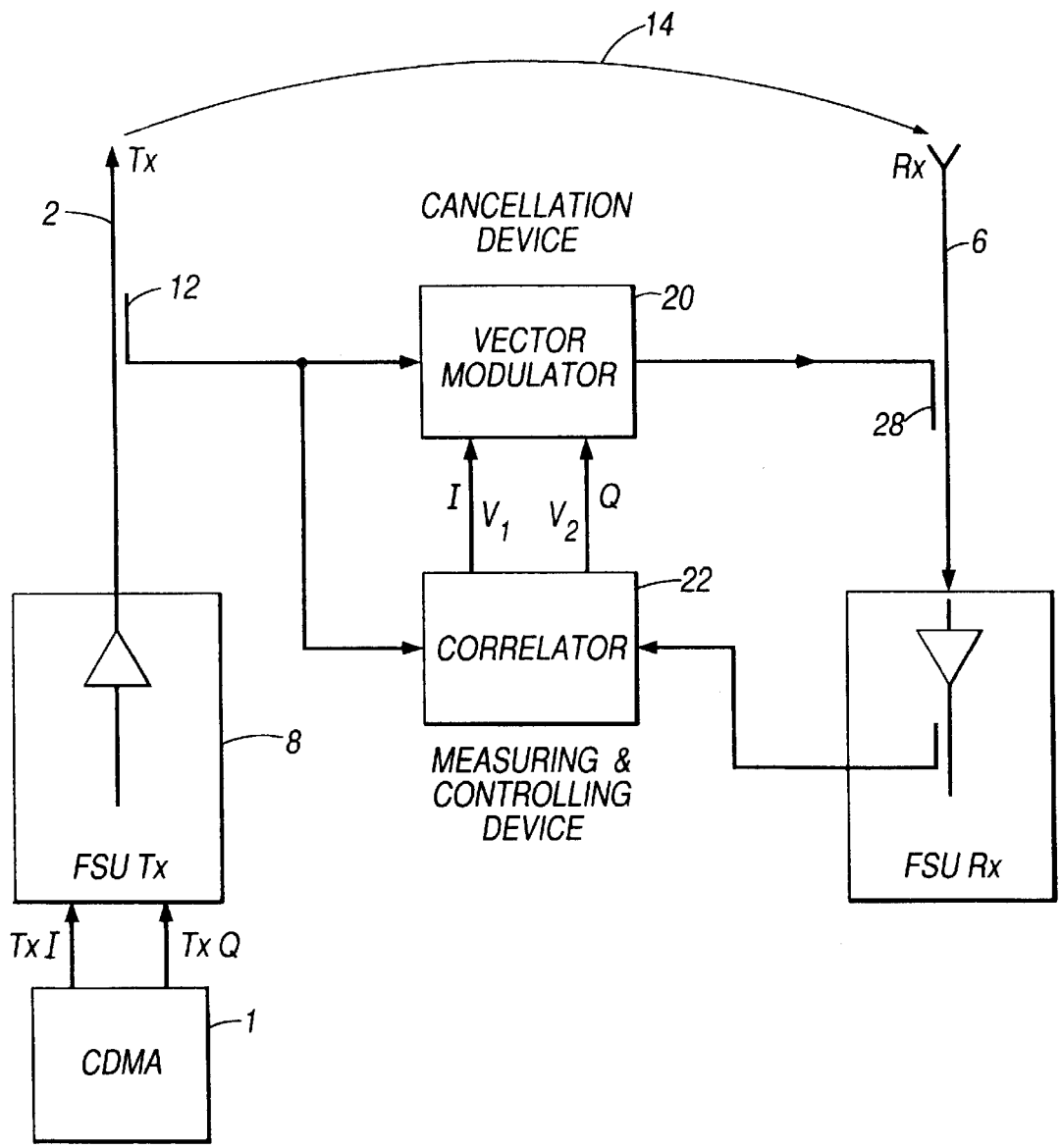

The present invention relates to radio transceivers which operate to both transmit and receive radio signals. In particular, but not exclusively, the present invention relates to radio transceivers, which are provided with a means to isolate signals transmitted by a transmitter of the transceiver system and received by a receiver of the transceiver system.

In modem radio communications equipment it is often a requirement to both transmit and receive radio signals. Such transmitted and received radio signals may be on different frequencies separated by a guard band. As such, in order to ensure that signals transmitted from a transmit antenna of the transceiver do not corrupt and distort signals received on a receive antenna, it is necessary to provide isolation between the transmitter and receiver of the transceiver system.

In broadband Code Multiple Access systems (CDMA), the transmit and receive signals have a relatively wide bandwidth. As such, the bandwidth of the transmit and receive signals may be comparable to the guard band separating the transmit and receive frequency bands.

In known systems, a duplexing filter is provided which is coupled to the output of the transmitter and the input of the receiver in order to effect the desired frequency separation between transmitter and receiver.

The purpose of the duplexing filter is to provide isolation between the Transmit (Tx) and the Receive (Rx) ports whilst connecting the Tx and the Rx to a common antenna. This is achieved by filtering the appropriate Rx and Tx frequencies prior to combining them at the antenna port. A typical duplexing filter achieves 30 to 40 decibels (dB) isolation between the Rx and the Tx ports. Since the attenuation is provided by filtering, each duplexing filter is dedicated to a specific band of Rx/Tx frequencies.

It is well known in the art of radio transceiver systems that dual or multi-mode handsets, operating in two or more frequency bands, use a separate duplexing filter for each frequency band, with the appropriate band being selected by a switch. Since the duplexing filters are relatively large components, this approach becomes less attractive for multi-mode operation due to lack of space in the handset.

A truly multi-mode terminal must have a flexible architecture which covers arbitrary standards and frequencies. For such a terminal, a key device is a duplexer, which provides Rx/Tx isolation without the need for filtering which is dedicated to specific frequencies.

A further disadvantage with known duplexing filter based transceiver systems is that an inherent insertion loss associated with the connection of the duplexing filter to the receiver, causes a degradation in the receiver noise figure and furthermore reduces the power with which the transmitted signal may be transmitted. Another disadvantage with duplexing filters is that impairment is caused to the received and transmitted signals as a result of in-band amplitude and group delay ripple effects caused by the duplexing filter. This, in turn leads to loss of capacity in a radio system such as a CDMA system. The impairment is more significant in broadband systems such as broadband CDMA, in which the bandwidth of signals is comparable to the receiver and transmitter frequency separations.

The aforementioned disadvantages represent a technical problem which is addressed by the present invention.

SUMMARY OF THE INVENTION

The present invention relates to a transceiver which provides fully duplexed operation without Rx/Tx filtering in the frequency domain. Since the need for a duplexing filter is eliminated, the new transceiver is ideally suited for a flexible architecture terminal. Furthermore, since the receive and transmit separation is now not based on frequency selectivity, the receive and transmit frequencies can be allocated more closely, which leads to more flexible network planning.

According to the present invention there is provided a radio communications transceiver which operates to transmit radio signals via a transmit antenna and receive radio signals via a receive antenna, wherein said transmit and receive antennas are disposed to provide at least a substantial amount of radio signal isolation therebetween, wherein said radio communications transceiver further including a cancellation device comprising a first coupler coupled to the transmit antenna and arranged to extract a sample of said transmit signal, a second coupler coupled to the receiver antenna and arranged to extract a sample of said received signal, a control unit fed on first and second inputs with said transmit and said received signal samples respectively, said control unit operating to generate an error signal representative of a correlation of said transmit and received radio signals, which error signal is fed to a modulator which operates to modulate said transmit signal sample, consequent upon said error signal which modulated transmit signal sample which is fed to said radio receiver via a further coupler, and which modulated transmit signal sample serves to substantially cancel transmit signals received by said receiver antenna, said cancellation device operating in combination with said disposal of said transmit and receive antennas to effect a desired radio signal separation between said transmit and receive signals.

The transmit and receive antennas may be disposed so as to be substantially orthogonal. The transmit and receive antennas may be separated by a short distance, thereby providing said at least substantial radio signal isolation.

The control unit may comprise an adaptive control unit which operates in conjunction with a look-up table to provide control coefficients which when applied to said cancellation device provide substantial cancellation of said transmit signal received by said received antenna.

The adaptive control unit may comprise a gradient search algorithm and said controller operates in a closed loop configuration. Alternatively, the adaptive control unit may compute the value of said control coefficient based on a model of said cancellation device and said sample of said transmit and said received signal, with said control unit operating in an open loop configuration. Alternatively, the adaptive control unit may pre-calculate said control coefficients in a manner so as to identify an area of the global minimum and subsequently perform a gradient search to optimise said control coefficients for a local minimum, thus operating initially in an open loop configuration and thereafter operating in a closed loop configuration.

The initial substantial amount of radio frequency isolation may be provided by means of a hybrid coupler device. Alternatively, the initial substantial amount of radio frequency isolation may be provided by means of a circulator device.

The transceiver may further include a filter which is arranged to provide a substantial level of isolation between transmit and receiver antennas.

According to a further aspect of the present invention there is provided a method of transmitting and receiving signals contemporaneously using two antennas separated by a short distance or two co-located but orthogonal antennas, comprises the steps of measuring the inherent coupling between two antennas, using a cancellation device connected between the two antennas to form a cancellation path, and a control device which operates to control the cancellation device in accordance with the measured coupling so that the cancellation path is equal in magnitude and opposite in phase of the coupling between the two antennas.

In modern radio communications equipment it is often a requirement to use wide band transmitters which are arranged to transmit radio frequency signals which occupy a substantial bandwidth, such as for example, broadband CDMA signals. Wide band transmitters suffer a problem in that generation of the wide band radio frequency signal within a predetermined frequency range using a conventional super heterodyne transmitter arrangement in which an intermediate frequency signal is formed, requires the use of transmit filters to reject spurious and mirror frequency signals. Such filters are expensive and furthermore, as a result of the wide band transmit signal, are difficult to implement. Therefore, providing an inexpensive transmitter arrangement wherein a broadband radio frequency signal is generated, in a cost effective manner, represents a technical problem which is addressed by the present invention.

According to a first aspect of the present invention there is provided a transmitter for transmitting broadband radio frequency signals, comprising a vector modulator which operates to generate said broadband radio frequency signal from I and Q components of a baseband signal by modulating a reference frequency signal with said I and Q components of said baseband signal which reference frequency signal is substantially at a carrier frequency of the broadband radio frequency signal, an envelope detector connected to an output of the vector modulator and arranged to generate a signal representative of the power in the broadband radio frequency signal at said reference frequency, and a comparator loop controller which operates to adjust biasing conditions of said I and Q components in dependence upon said signal representative of the power in said broadband radio frequency signal at said reference frequency detected by said envelope detector so that a component at the reference frequency signal is substantially minimised.

By providing a transmitter with an arrangement such that the broadband radio frequency signal is generated in a single stage by modulating an appropriate reference frequency signal with the I and Q components of the baseband signal, a requirement for expensive filters and other components associated with generating the radio frequency signal from intermediate frequency signals is obviated. However, where the transmitted signal is a broadband radio frequency signal, and which radio frequency signal must vary within a predetermined bandwidth, a technical problem exists in suppressing a component of the transmitted signal at the reference or carrier frequency. By arranging for an envelope detector to detect the power at the reference frequency, and feeding back the detected power to a comparator and loop controller, which operates to adjust the voltage bias of the conductors communicating to respective modulators I and Q components, the carrier component or reference component can be reduced by correspondingly adjusting the voltage bias at which the I and Q components are communicated to the modulator. The voltage bias of the I and Q components operates to change the power component of the transmitted signal at the reference or carrier frequency.

The transmitter may further include a low pass filter connected to an output of the envelope detector and an input to the comparator and loop controller, which low pass filter serves to average out amplitude fluctuations of the signal representative of the envelope of the broadband radio frequency signal.

The transmitter may further include a power amplifier connected between the output of the vector modulator and an input to the envelope detector.

Other objects, advantages and novel features of the present invention will become apparent from the following detailed description of the invention when considered in conjunction with the accompanying drawings.

Figure 2:
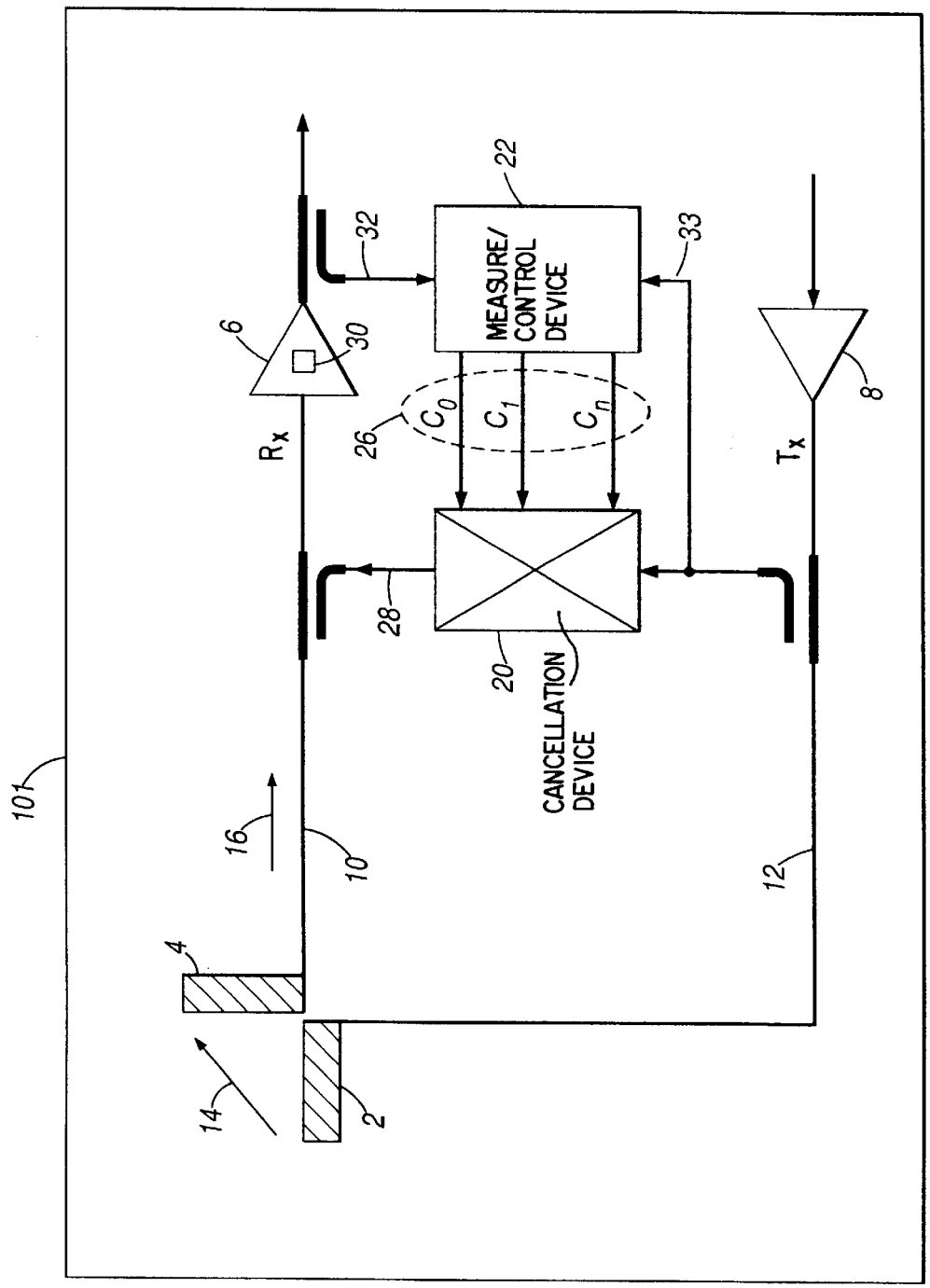
Figure 3:
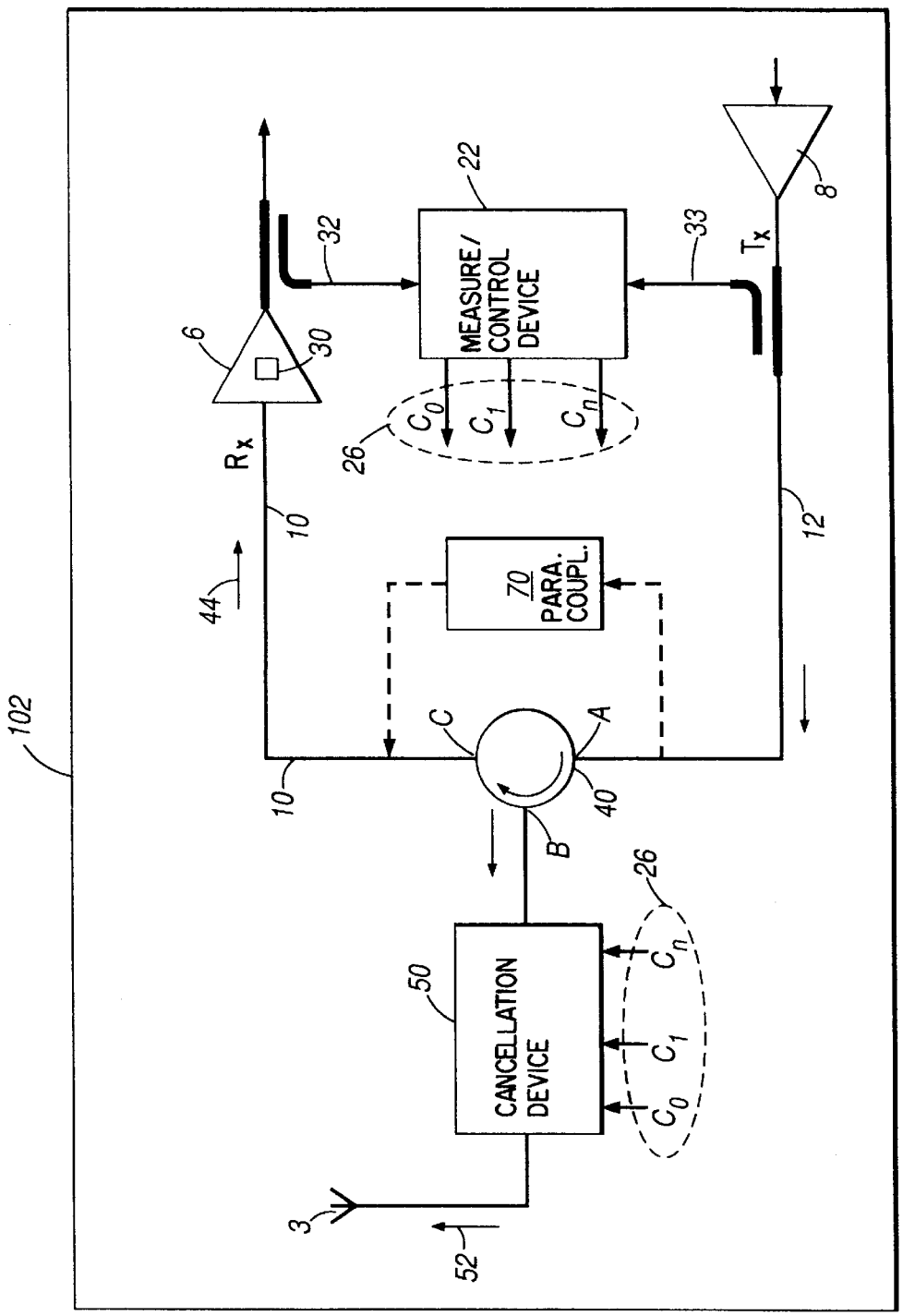
Figure 4:
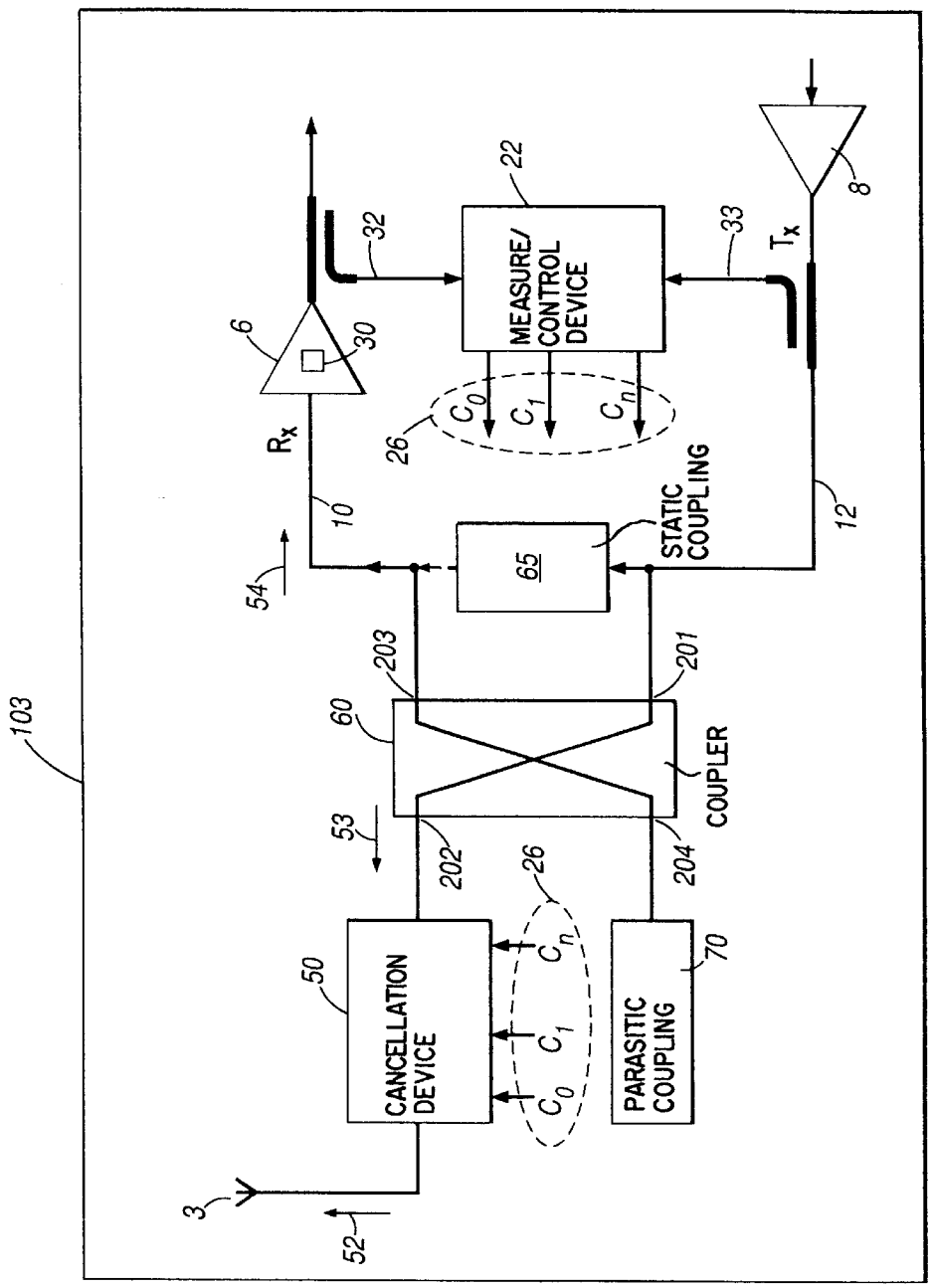
Figure 5:
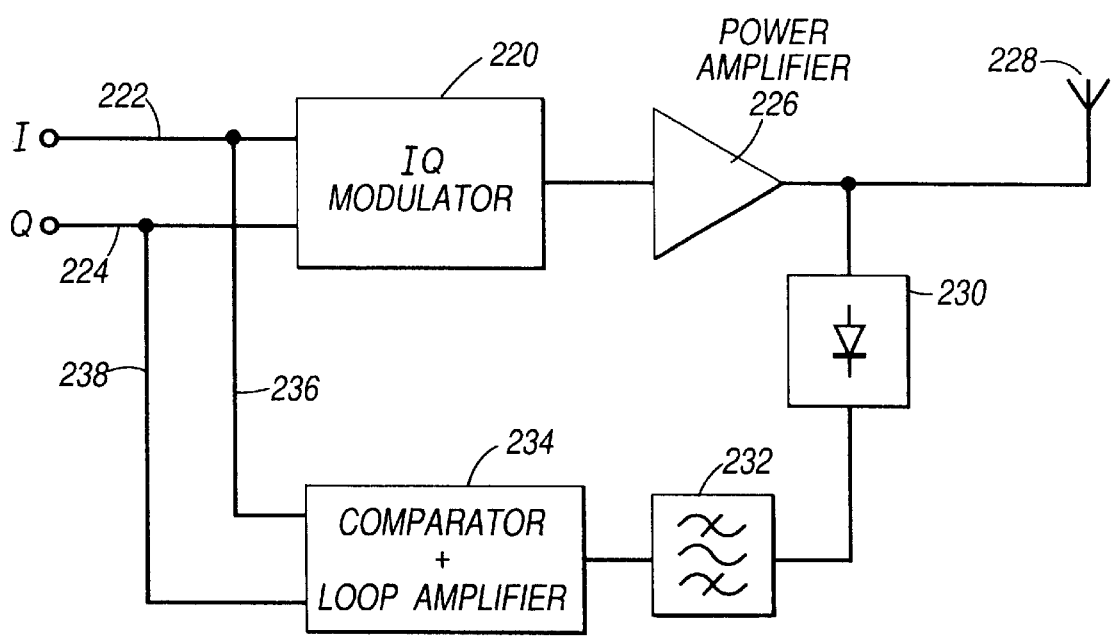
Figure 6:
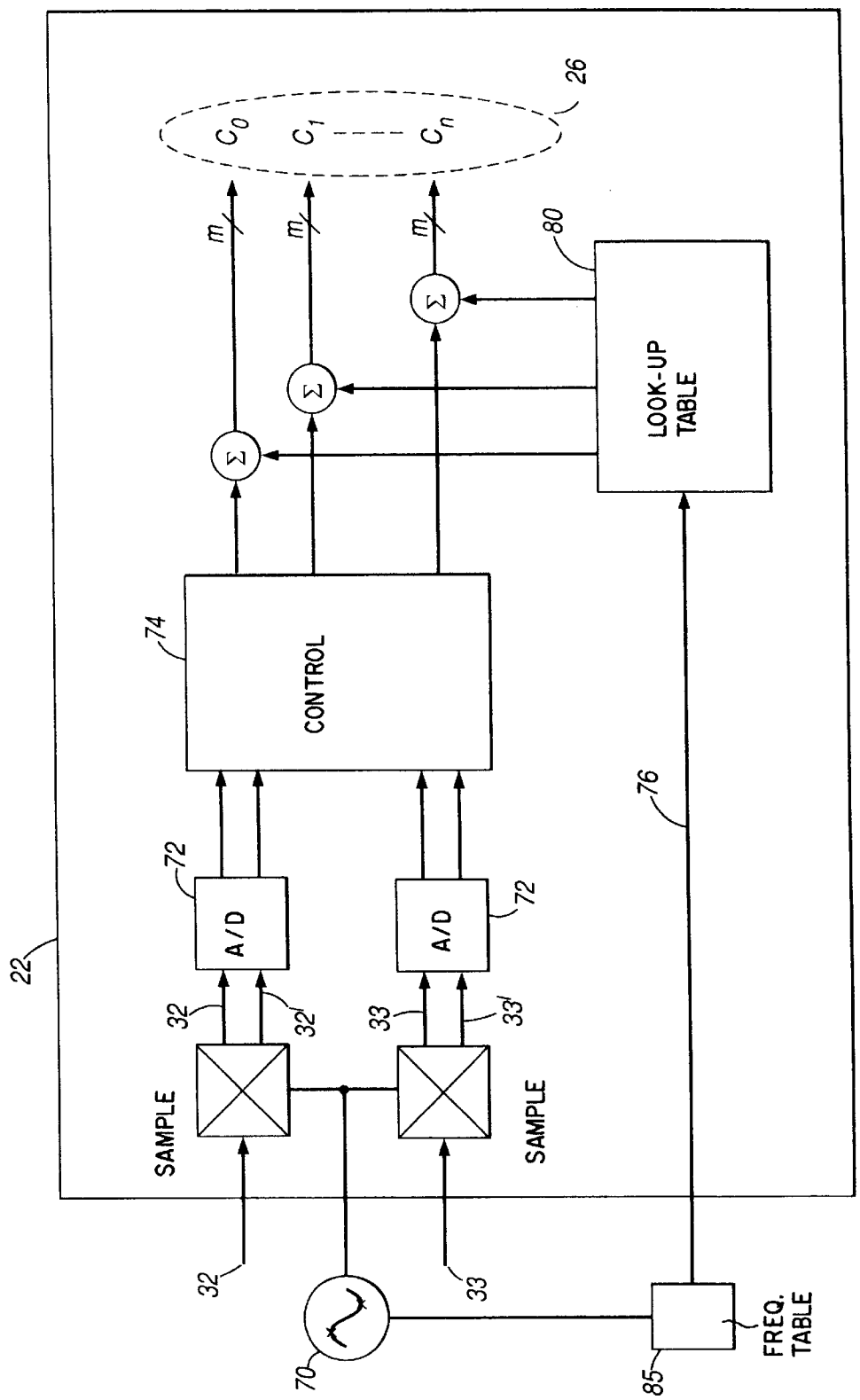

FIG. 1 which is a schematic block diagram of a transceiver for radio frequency communications, FIG. 2 which is a schematic block diagram of a transceiver for radio frequency communications according to one aspect of the present invention, FIG. 3, which is a schematic block diagram of a transceiver for radio frequency communications according to a further aspect of the present invention, FIG. 4 which is a schematic block diagram of a transceiver for radio frequency communications according to yet a further aspect of the present invention, FIG. 5 which is a schematic block diagram of a transmitter w circuit, wherein there is provided a controller for controlling a carrier component of the broadband radio frequency signal, and FIG. 6 is a schematic block diagram of a controller unit according to an aspect of the present invention, used in FIGS. 2,3 and 4.

DETAILED DESCRIPTION OF THE INVENTION

An example embodiment of the present invention is provided in

FIG. 1. In FIG. 1, a CDMA transmitter 1 is shown to feed a transmitter 8 with I and Q components of the CDMA signal.

A transmitter coupler 12, connected to the transmit antenna 2, removes a sample of the transmit signal. The sample of the transmit signal represents the transmitted CDMA signal but with a small part of the total power. The transmit signal sample is fed to a vector modulator 20, and a correlator 22.

The line 14, in FIG. 1 is representative of a coupling between the transmit and received antennas. This coupling has an effect of causing the transmit signal to be present at a front end of the receiver, as a result of coupling between the transmit and receive antenna. As such a component of transmit signal detected by receiver 6. A representative sample of the receiver signal may be thereby taken from the receiver and fed to a second input of the correlator 22. The correlator 22, serves to generate error signals $V_1$, $V_2$, representative of I and Q components of a correlation between the transmit signal sample fed on a first input to the correlator 22, and the received signal fed on a second input to the correlator. The error signals $V_1$, $V_2$, are fed to first and second inputs of a vector modulator 20, with the transmit signal sample fed to a third input of the vector modulator 20. The vector modulator 20, serves to modulate the transmit signal sample, with the complex error signal $V_1$, $V_2$. The modulated transmit signal sample is thereafter fed to the receiver 6, via a coupler 28. By arranging for this correlation apparatus, in combination with a separation of the transmitter and received antennas, an isolation of the transmitter and receiver can be effected without a requirement of a duplexing filter.

In FIGS. 2, 3 and 4 the present invention is explained by way of example, with each example using a different method to provide some initial isolation between the Rx and Tx ports. None of these methods alone provide the necessary Rx/Tx isolation of 30 to 40 dB required for cellular mobile applications. However, with the enhanced isolation provided by the cancellation device and the controller according to the present invention, adequate isolation performance can be achieved.

In FIG. 2, a radio transceiver system 101 is shown which operates as part of a radio communication system (not shown). Two co-located antenna elements 2,4 are arranged in an orthogonal fashion, so as to minimise coupling between them. The antenna elements may be dipoles or patches. For frequency division duplexing operation the orthogonal elements are connected to the Receiver Unit 6 and Transmitter Unit 8.

It is well known in the art that the frequency isolation achievable between two cross polarised co-located antennas, such as those shown in FIG. 2, is limited to the region of 15–25 decibels. This is due to the asymmetry between the antenna elements 2,4 and gives rise to parasitic coupling, shown by arrow 14, between the Tx signal path 12 and the Rx signal path 10. The amount of parasitic coupling between the Rx and Tx signals is represented by a static coupling coefficient Ko.

Furthermore, some of the transmitted signal from the Tx antenna 2 is reflected back to the Rx antenna 4 from the surrounding environment. Since this environment is always changing during the operation of the radio communication system, this gives rise to a time variant coupling between the Rx and Tx signals. The amount of time variant coupling is denoted by the dynamic coupling coefficient K(t).

The initial 15–25 decibel isolation achievable between two cross polarised co-located antennas can be enhanced to 30–40 decibels by means of a cancellation device 20 and control unit 22 according to the present invention.

In this preferred embodiment of the present invention, the combination of the static (Ko) and dynamic (K(t) coupling coefficients (Ko+K(t)), hereafter referred to as the leakage signal, is shown by arrow 16. The leakage signal 16 travels via conductor 10 to the input of the receiver unit 6. The leakage signal 16 is then amplified by a low noise amplifier 30 located within the receiver unit 6. A small sample of the amplified leakage signal (SRx) is then applied by a conductor 32 to control unit 22. A sample of the original transmitted signal (STx) transmitted from Transmitter Unit 8 is applied via conductor 33 to the control unit 22. The control unit 22 operates to correlate the SRx and STx signal samples and applies control signals C0, C1 ... Cn to a Vector Modulator 20. Control coefficients 26 comprising of variables C0, C1 ... Cn serve to control the transfer function of the vector modulator 20.

The control coefficients are continuously updated as a result of the dynamic component K(t) of the leakage signal being fed to the control unit. Thus, the transfer function of the vector modulator which depends on the control coefficients is also continuously updated.

The control unit 22 operates to set the control coefficients 26 so that a cancellation signal 28 opposite to the leakage signal 16 is generated at the output of the vector modulator 20. The cancellation signal as shown in FIG. 2 by arrow 28 is approximately equal to –(Ko+K(t)) and has the effect of cancelling the leakage signal 16. By the continuous updating of control coefficients 26, both the static (Ko) and time variant (Kt) components of the leakage signal 16 are substantially cancelled at the input of the receiver unit 6. Any components of the leakage signal 16 still remaining are input back into receiver unit 6 and the process is repeated.

A further embodiment of the present invention is shown in FIG. 3, where parts also appearing in FIG. 2 bear identical numeric designation. In FIG. 3, a radio transceiver system 102 is shown which operates as part of a radio communication system (not shown). A circular device 40 is employed to combine the Tx signal path 12 and the Rx signal path 10. The circular 40 is a three part device which rotates a signal from port "A" to port "B" and from port "B" to "C" hence providing isolation between ports "A" and "C". An ideal isolator has infinite isolation between ports "A" and "C" and therefore in principle would be capable of providing sufficient isolation required for duplexing operation. However, as is well known in the art, the achievable isolation with a circulator device is limited to approximately 10–20 decibels. This is due to the imperfect cancellation of the magnetic fields within the circulator device. In addition, the reflection coefficients at each port are finite and thus give rise to parasitic coupling 70 between ports "A" and "C". This parasitic coupling 70 is represented by the static coupling coefficient Ko.

Furthermore, as was detailed in FIG. 2, some of the transmitted signal is reflected back to the antenna from the surrounding environment. This signal appears at port "B" of the circular device 40 and is in turn coupled to the input of the receiver unit 6. Since the environment is always changing during operation of the system, this dynamic coupling is denoted by a time varying voltage reflection coefficient Γa(t).

The initial 10–20 decibel isolation of the circular device 40 can be enhanced according to this embodiment of the present invention, by means of a cancellation device 50 and a control unit 22.

In FIG. 3, the reflected signal Γa(t) from antenna unit 3 is shown by the arrow 52 and appears at the input of the cancellation device 50. This signal passes through the cancellation device and in a modified form appears at port "C" of the circulator device 40 and is represented by the static coefficient ΓKo.

Control coefficients 26 comprising of coefficient C0, C1 ... Cn control the transfer function of the cancellation device 50. If the transfer function is set for 1 by the control coefficients 26 then ΓKo=Γa and the entire reflection signal appears at port "B". In this case, the leakage signal (Ko+Γa(t)) represented by arrow 44 is present at the input of receiver unit 6 and is amplified by low noise amplifier 30 present in the receiver unit 6. A small sample of both the leakage signal SRx represented by arrow 32 and the originally transmitted signal STx represented by arrow 33 are applied to the control unit 22. The control unit correlates the SRx and STx signal and applies control signals 26 to the cancellation device 50. The control signals are continuously updated in accordance with the changing environment around antenna unit 3.

The control unit sets the control coefficient such that Γa(t) is continuously mapped to provide a constant reflection coefficient at the output of the cancellation device. By the continuous updating of the control coefficient, the time dependant of the antenna reflection coefficient Γa(t) is removed and a static reflection coefficient ΓKo is generated. In order to achieve perfect cancellation, the control unit 22 adaptively adjusts the transfer function of the cancellation device such that ΓKo+Ko=0.

Yet a further embodiment of the present invention is shown in FIG. 4, in which items also appearing in FIGS. 2 & 3 bear identical numerical designation. In FIG. 4, a radio transceiver system 103 is shown which operates as part of a radio communication system (not shown). In FIG. 4, a three decibel hybrid coupler unit 60 is used to combine the Tx signal path 12 and the Rx signal path 10 in a manner similar to that of the circulator unit 40 shown in FIG. 3. The three decibel coupler unit 60 has the technical advantage of having a wider band than the circulator unit 40. However, as is well known in the art, there is an inherit 3 decibel loss in coupler unit 60 due to the fact that the signals are equally split between the antenna unit 3 and the termination unit 70.

The achievable isolation with a 3 decibel coupler such as the one shown in FIG. 4 is limited to approximately 20 decibels. This is due to the fact that there is a static coupling coefficient Ko 65 between ports 201 and 203 of coupler unit 60. This is due to a finite directivity and return loss of the coupler unit 60. Furthermore, as in FIGS. 2 and 3, a portion of the transmitted signal is reflected back to antenna unit 3 from the surrounding environment. In the absence of a cancellation device, the signal is coupled to port 201 and port 203. Due to the fact that the environment is always changing during the operation of the system, this coupling is denoted by a time variant voltage reflection coefficient Γa(t) 52.

The initial 20 decibel isolation of coupler unit 60 can be enhanced by means of a cancellation device 50 and a control unit 22. In FIG. 4, the signal Γa(t) 52 reflected from the antenna unit 3 appears at the input of the cancellation unit 50. This signal 52 passes through the cancellation unit and in a modified form (ΓKo), represented by arrow 53, appears at port 202 of the coupler unit 60.

The control coefficients 26 comprising of coefficients C0, C1 ... Cn, control the transfer function of the cancellation unit 50. If the transfer function is set for 1 by the control coefficients, then ΓKo=Γa and the entire reflected signal appears at port 202. In this case a signal equal to (Ko+Γa(t)/√2) and hereafter referred to as the leakage signal and represented by arrow 54, is present at the input of receiver unit 6. This signal is then amplified by the low noise amplifier 30 present in receiver unit 6. A small sample of both the leakage signal (SRx) and the originally transmitted signal (STx) is applied to the controller unit 22. The controller unit correlates the SRx and STx signals and applies control coefficients 26 to the cancellation device 50. The control signals are continuously updated in accordance with the changing environment around antenna unit 3.

The controller unit sets the control coefficient so that Γa(t) is continuously mapped to provide a constant reflection coefficient at the output of the cancellation device. By the continuous update of the control coefficient, the time variance of the antenna reflection coefficient Γa(t) is removed and a static reflection coefficient ΓKo is generated. For perfect cancellation, the control unit adaptively adjusts the transfer function of the cancellation unit such that (Ko+Γa(t)/√2)=0.

FIG. 5 provides an example embodiment of a transmitter for broadband CDMA signals where the radio frequency signal is generated in a single stage. In FIG. 5, a vector modulator 220, is fed with I and Q components of a baseband CDMA signal on conductors 222, 224. The resulting radio signal is fed to an amplifier 226 and then to a transmit antenna 228. Also connected to an output of the power amplifier 226 is an envelope detector 230, which in this example embodiment is a diode operating as a rectifier.

The envelope detector 230 is connected to a low pass filter 232. The output of low pass filter 232 feeds a comparator and loop controller 34. The comparator and loop controller 234 generates first and second output signals on conductors 236, 238, which are connected to the conductors 222, 224, respectively.

The envelope detector 230 rectifies the RF envelope and the low pass filter 232 averages out the amplitude varying components. Broadband CDMA used in CDMA link and also the IS95 system waveforms passes a high proportion of amplitude modulation, this means that through correct choice of the low pass filter 232 cut off, the dc voltage fed to the comparator and loop controller 234 contains a component due to the modulation and a component due to any non time varying signal such as carrier leakage. Thus, for a given output power, the input to the comparator and loop controller 234 is a voltage proportional to the carrier leakage plus and offset due to the modulation.

The error signal is processed by the comparator and loop controller 234 and it produces two dc levels that are used to dc offset the I and Q inputs of the I and Q vector modulator 220.

DC levels at the inputs to the I and Q vector modulator 220 offset the carrier impression, thus if the name of the feedback is correct, the comparator and loop controller will adjust the I and Q input level to reduce the error signal to a minimum, thus reducing the carrier level at the output of the modulator.

In FIG. 6, where parts also appearing in FIGS. 2, 3 and 4 bear identical numerical designation, control unit 22 is shown in more detail. As in FIGS. 2, 3 and 4 sample leakage signal SRx 32 and sample transmit signal STx 33 are applied to control unit 22. A local oscillation 70 provides a complex sample of signals SRx 32 and STx 33. These complex samples, SRx' 32' and STx' 33' respectively, are input along with sample signals SRx and STx to a pair of analogue-to-digital converters 72. The sample signals are then applied to an adaptive control unit 74. The output of the adaptive control unit 74 are the control coefficients 26 comprising of coefficients C0, C1 ... Cn. Each coefficient comprises of an m bit wide bit binary word, where m is an integer value. There control coefficients 26 are then applied to a cancellation unit.

The control coefficients are initially set to fulfil the criteria for cancellation of the static components of the leakage signal at the receiver input. This is achieved by setting SRx=0 when Γa(t)=0. The appropriate data for this condition is stored in a Look-Up Table 80. As is well known in the art, the control coefficient are frequency dependent. In order for the Look-Up Table 80 to provided the correct data, the frequency as determined by Frequency Table 85 is input to the Look-Up Table via conductor 76. Frequency Table 85 further operates to control the frequency of Local Oscillator 70. Furthermore, tolerances of circuit elements such as the cancellation device, circulator device, vector modulator device, and hybrid coupler are also represented the Look-Up Table 80.

The complex variable SRx'/STx' (t) corresponds to the transfer function of the time variant leakage path K(t) or similarly to Γa(t). These signals are applied to the adaptive control unit 74.

In the adaptive control unit 74, the appropriate control coefficients 26 for cancellation of the time variant components are continuously computed and updated. The computation is based on the amplitude and phase of SRx'/STx' and a built in algorithm representing the model of the cancellation device.

As will be appreciated by those skilled in the art, the present invention finds application with other radio systems and with a variety of modulation schemes besides CDMA.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A radio communication transceiver system comprising:
   a transmit antenna;
   a receive antenna, said transmit and receive antennas being disposed to provide at least a substantial amount of radio signal isolation therebetween;
   a radio communications transceiver operable to transmit radio signals via said transmit antenna and to receive radio signals via said receive antenna;
   a first coupler coupled to said transmit antenna and arranged to extract a sample of said transmit signal;
   a second coupler coupled to said receiver antenna and arranged to extract a sample of said received signal;
   a control unit connected to receive on first and second inputs thereof said transmit and said received signal samples respectively, said correlator being operable to generate an error signal representative of a correlation of said transmit and received radio signals;
   a cancellation device connected to receive said transmit signal sample and being operable for receiving said error signal and for modulating said transmit signal sample in accordance therewith; and
   a further coupler coupled to said receiver antenna and operable for receiving said modulated transmit signal sample and for feeding it to said receiver antenna, said modulated transmit signal sample serving to substantially cancel transmit signals received by said receiver antenna;
   wherein said control unit comprises an adaptive control unit which operates in conjunction with a look-up table to provide control coefficients which, when applied to said cancellation device, provide substantial cancellation of said transmit signal received by said received antenna, said adaptive control unit comprising a gradient search algorithm with said control unit operating in a closed loop configuration.

2. A radio communication transceiver system as claimed in claim 1, wherein said transmit and receive antennas are disposed so as to be substantially orthogonal.

3. A radio communication transceiver system as claimed in claim 1, wherein said transmit and receive antenna are separated by a short distance, thereby providing said at least substantial radio signal isolation.

4. A radio communication transceiver system as claimed in claim 1, whereby said at least a substantial amount of radio frequency isolation is provided by means of a hybrid coupler device.

5. A radio communication transceiver system as claimed in claim 1, whereby said at least a substantial amount of radio frequency isolation is provided by means of a circulator device.

6. A radio communication transceiver system as claimed in claim 1, wherein said transceiver further comprises a filter arranged in a manner to provide a substantial level of isolation between said transmit and receiver antenna.

7. A radio communication transceiver system comprising:
   a transmit antenna;
   a receive antenna, said transmit and receive antennas being disposed to provide at least a substantial amount of radio signal isolation therebetween;
   a radio communications transceiver operable to transmit radio signals via said transmit antenna and to receive radio signals via said receive antennal;
   a first coupler coupled to said transmit antenna and arranged to extract a sample of said transmit signal;
   a second coupler coupled to said receiver antenna and arranged to extract a sample of said received signal;
   a control unit connected to receive on first and second inputs thereof said transmit and said received signal samples respectively, said correlator being operable to generate an error signal representative of a correlation of said transmit and received radio signals;
   a cancellation device connected to receive said transmit signal sample and being operable for receiving said error signal and for modulating said transmit signal sample in accordance therewith; and
   a further coupler coupled to said receiver antenna and operable for receiving said modulated transmit signal sample and for feeding it to said receiver antenna, said modulated transmit signal sample serving to substantially cancel transmit signals received by said receiver antenna;
   wherein said control unit comprises an adaptive control unit which computes the value of control coefficients which, when applied to said cancellation device, provide substantial cancellation of said transmit signal received by said antenna; and
   wherein computation of said control coefficients by said adaptive control unit is based on a model of said cancellation device and said sample of said transmit and said received signal, with said control unit operating in an open loop configuration.

8. A radio communication transceiver system as claimed in claim 7, wherein said transmit and receive antennas are disposed so as to be substantially orthogonal.

9. A radio communication transceiver system as claimed in claim 7, wherein said transmit and receive antenna are separated by a short distance, thereby providing said at least substantial radio signal isolation.

10. A radio communication transceiver system as claimed in claim 7, whereby said at least a substantial amount of radio frequency isolation is provided by means of a hybrid coupler device.

11. A radio communication transceiver system as claimed in claim 7, whereby said at least a substantial amount of radio frequency isolation is provided by means of a circulator device.

12. A radio communication transceiver system as claimed in claim 7, wherein said transceiver further comprises a filter arranged in a manner to provide a substantial level of isolation between said transmit and receiver antenna.

13. A radio communication transceiver system comprising:
   a transmit antenna;
   a receive antenna, said transmit and receive antennas being disposed to provide at least a substantial amount of radio signal isolation therebetween;
   a radio communications transceiver operable to transmit radio signals via said transmit antenna and to receive radio signals via said receive antenna;

a first coupler coupled to said transmit antenna and arranged to extract a sample of said transmit signal;

a second coupler coupled to said receiver antenna and arranged to extract a sample of said received signal;

a control unit connected to receive on first and second inputs thereof said transmit and said received signal samples respectively, said correlator being operable to generate an error signal representative of a correlation of said transmit and received radio signals;

a cancellation device connected to receive said transmit signal sample and being operable for receiving said error signal and for modulating said transmit signal sample in accordance therewith; and a further coupler coupled to said receiver antenna and operable for receiving said modulated transmit signal sample and for feeding it to said receiver antenna, said modulated transmit signal sample serving to substantially cancel transmit signals received by said receiver antenna;

wherein said control unit comprises an adaptive control unit which pre-calculates control coefficients which, when applied to said cancellation device, provide substantial cancellation of said transmit signal received by said antenna; and wherein pre-calculation of said control coefficients by said adaptive control unit is performed in a manner so as to identify an area of the global minimum and subsequently perform a gradient search to optimise said control coefficients for a local minimum, thus operating initially in an open loop configuration and thereafter operating in a closed loop configuration.

14. A radio communication transceiver system as claimed in claim 13, wherein said transmit and receive antennas are disposed so as to be substantially orthogonal.

15. A radio communication transceiver system as claimed in claim 13, wherein said transmit and receive antenna are separated by a short distance, thereby providing said at least substantial radio signal isolation.

16. A radio communication transceiver system as claimed in claim 13, whereby said at least a substantial amount of radio frequency isolation is provided by means of a hybrid coupler device.

17. A radio communication transceiver system as claimed in claim 13, whereby said at least a substantial amount of radio frequency isolation is provided by means of a circulator device.

18. A radio communication transceiver system as claimed in claim 13, wherein said transceiver further comprises a filter arranged in a manner to provide a substantial level of isolation between said transmit and receiver antenna.

19. A method of transmitting and receiving signals contemporaneously using a transmitting antenna and a receiving antenna respectively which are disposed to provide at least a substantial amount of radio signal isolation therebetween, said transmitting antenna being operable for transmitting a transmit signal and said receiving antenna being operable for receiving a received signal, the method comprising the steps of:

a) extracting a sample of said transmit signal;
b) extracting a sample of said received signal;
c) correlating said transmit signal sample and said received signal sample;
d) generating an error signal representative of said correlation;
e) using said error signal to modulate said transmit signal sample in accordance therewith; and f) using said modulated transmit signal sample to feed to said receiver antenna to substantially cancel transmit signals received by said receiver antenna; wherein
    step d) comprises generating control coefficients determined from a look-up table for providing substantial cancellation of said transmit signal received by said received antenna; and
    said control coefficients are determined in accordance with a gradient search algorithm.

20. A method of transmitting and receiving signals contemporaneously using a transmitting antenna and a receiving antenna respectively which are disposed to provide at least a substantial amount of radio signal isolation therebetween, said transmitting antenna being operable for transmitting a transmit signal and said receiving antenna being operable for receiving a received signal, the method comprising the steps of:

a) extracting a sample of said transmit signal;
b) extracting a sample of said received signal;
c) correlating said transmit signal sample and said received signal sample;
d) generating an error signal representative of said correlation;
e) using said error signal to modulate said transmit signal sample in accordance therewith; and
f) using said modulated transmit signal sample to feed to said receiver antenna to substantially cancel transmit signals received by said receiver antenna; wherein
    step d) comprises generating control coefficients determined from a look-up table for providing substantial cancellation of said transmit signal received by said received antenna; and
    said control coefficients are computed in accordance with a model of a cancellation device.

21. A method of transmitting and receiving signals contemporaneously using a transmitting antenna and a receiving antenna respectively which are disposed to provide at least a substantial amount of radio signal isolation therebetween, said transmitting antenna being operable for transmitting a transmit signal and said receiving antenna being operable for receiving a received signal, the method comprising the steps of:

a) extracting a sample of said transmit signal;
b) extracting a sample of said received signal;
c) correlating said transmit signal sample and said received signal sample;
d) generating an error signal representative of said correlation;
e) using said error signal to modulate said transmit signal sample in accordance therewith; and
f) using said modulated transmit signal sample to feed to said receiver antenna to substantially cancel transmit signals received by said receiver antenna; wherein
    step d) comprises generating control coefficients determined from a look-up table for providing substantial cancellation of said transmit signal received by said received antenna; and
    said control coefficients are pre-calculated so as to identify an area of the global minimum and are subsequently optimized in accordance with a gradient search algorithm for a local minimum.

* * * * *